United States Patent
Majumdar et al.

(10) Patent No.: US 6,643,155 B2
(45) Date of Patent: Nov. 4, 2003

(54) POWER SEMICONDUCTOR DEVICE, POWER ARM AND INVERTER CIRCUIT

(75) Inventors: Gourab Majumdar, Tokyo (JP); Shinji Hatae, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 321 days.

(21) Appl. No.: 09/880,919

(22) Filed: Jun. 15, 2001

(65) Prior Publication Data

US 2002/0079519 A1 Jun. 27, 2002

(30) Foreign Application Priority Data

Dec. 27, 2000 (JP) ......................................... 2000-397989

(51) Int. Cl.[7] ...................... H02M 7/5387; H02H 7/122
(52) U.S. Cl. .................. 363/132; 363/56.02; 363/56.12
(58) Field of Search ............................ 363/39, 40, 41, 363/56.02, 56.12, 58, 97, 98, 131, 132

(56) References Cited

U.S. PATENT DOCUMENTS 4,317,165 A * 2/1982 Sullivan .................... 363/97 X
5,969,964 A   10/1999 Mangtani
6,351,399 B2 * 2/2002 Takanashi et al. ......... 363/56.05

FOREIGN PATENT DOCUMENTS

| JP | 9-247951 | 9/1997 |
| JP | 11-27931 | 1/1999 |

* cited by examiner

Primary Examiner—Jessica Han
(74) Attorney, Agent, or Firm—Oblon, Spivak, McClelland, Maier & Neustadt, P.C.

(57) ABSTRACT

It is an object of the present invention to provide an inverter circuit including a power arm ensuring a high breakdown voltage and having low probability of malfunction. In a power arm element consisting of a switching element and a diode connected in inverse-parallel connection thereto, n free wheeling diodes ($n \geq 2$) connected in series are connected in inverse-parallel connection to a switching element (1b). A breakdown voltage between an anode and a cathode of each free wheeling diode is defined to be 1/n of a breakdown voltage of the switching element (1b). That is, the breakdown voltage of each free wheeling diode is reduced to 1/n to reduce a thickness of a $n^-$ drift region. A transient voltage characteristic during flow of a free wheeling current can be thereby kept low. The drop in the breakdown voltage is compensated with the n free wheeling diodes connected in series, to thereby ensure breakdown voltage of a degree approximately the same as that of the switching element.

16 Claims, 10 Drawing Sheets

F I G . 2
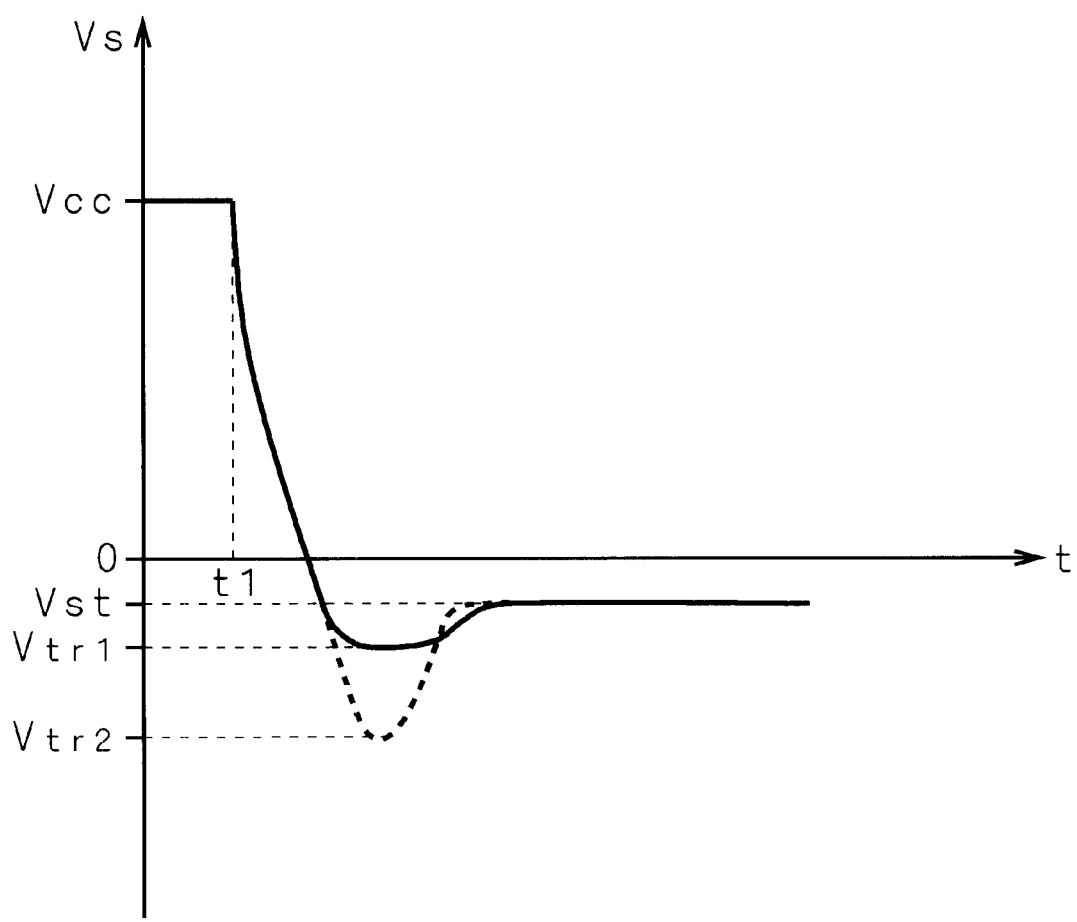

POWER SEMICONDUCTOR DEVICE, POWER ARM AND INVERTER CIRCUIT

BACKGROUND OF THE INVENTION

1. Field of the Invention

The present invention is directed to an inverter circuit for converting DC power and AC power into AC power having arbitrary frequency, a power arm for forming the inverter circuit and a power arm element for forming the power arm.

2. Description of the Background Art

FIG. 8 shows a three-phase inverter circuit as an example of an inverter circuit using a power arm in the background art. In FIG. 8, the reference number V1 represents a DC voltage generating circuit such as a DC voltage source consisting of a commercial AC power supply and a diode bridge circuit or a battery. The reference numbers HB1, HB2 and HB3 represent half bridge circuits including a single-phase power arm for generating an AC voltage from a DC voltage Vcc generated at the DC voltage generating circuit V1.

A power arm of the half bridge circuit HB1 consists of a power arm element including a switching element 1a and a free wheeling diode 2a connected in inverse-parallel connection and another power arm element including a switching element 1b and a free wheeling diode 2b. These power arm elements are connected in series at a node U. An IGBT (insulated gate bipolar transistor), a power bipolar transistor, a power MOSFET (metal oxide semiconductor field effect transistor) and the like are applicable as the switching elements 1a and 1b.

More particularly, an electrode for inputting current of the switching element 1a (corresponding to a collector when the switching element 1a is an N-channel type IGBT) is connected to a cathode of the free wheeling diode 2a and an electrode for outputting current of the switching element 1a (corresponding to an emitter when the switching element 1a is an N-channel type IGBT) is connected to an anode of the free wheeling diode 2a. The switching element 1b and the free wheeling diode 2b are constituted similarly. The electrode for outputting current of the switching element 1a is connected to an electrode for inputting current of the switching element 1b at the node U.

The electrode for inputting current of the switching element 1a is connected to a terminal of high potential side of the DC voltage generating circuit V1 at a node N1. An electrode for outputting current of the switching element 1b is connected to a terminal of low potential side of the DC voltage generating circuit V1 at a node N2.

Similar to the half bridge circuit HB1, the half bridge circuits HB2 and HB3 respectively include two power arm elements connected in series at nodes V and W. Switching elements of each power arm element are connected to the terminal of high potential side and the terminal of low potential side of the DC voltage generating circuit V1 at the nodes N1 and N2. For brevity, the power arm elements of the half bridge circuits HB2 and HB3 are omitted in FIG. 8.

Three-phase loads (not shown) including three connecting terminals having shapes such as Y shape or Δ shape are connected to the nodes U, V and W.

A control signal such as a PWM (pulse width modulation) signal is applied from an HVIC (high voltage integrated circuit) 3 acting as a control circuit to control electrodes (corresponding to a gate when the switching elements 1a and 1b are IGBTs) of the switching elements 1a and 1b of the half bridge circuits HB1. On receipt of the control signal in predetermined timing, each of the switching elements 1a and 1b is turned on and off to generate an AC voltage having arbitrary frequency to be applied to the terminal of the three-phase load connected to the node U. Similar to the half bridge circuit HB1, control electrodes of the switching elements of the half bridges HB2 and HB3 receive a control signal from the HVIC 3 to apply an AC voltage having arbitrary frequency to the terminals of the three-phase loads connected to the nodes V and W.

Peripheral circuits such as a voltage source V2 for operating the HVIC 3, a resistor R1 and a capacitor C1 are connected to the HVIC 3. The HVIC 3 and its peripheral circuits may be individually provided to each of the half bridge circuits HB1, HB2 and HB3. Alternatively, each of the half bridge circuits HB1, HB2 and HB3 can be controlled by a single set of the HVIC 3 and its peripheral circuits. FIG. 8 shows an example in which the HVIC 3 and the capacitor C1 are individually provided to each of the half bridge circuits HB1, HB2 and HB3 and the voltage source V2 and the resistor R1 are shared among the half bridge circuits HB1, HB2 and HB3.

A ground potential terminal of the HVIC 3 is connected to the node N2 for receiving a ground potential GND from the terminal of low potential side of the DC voltage generating circuit V.

The problems of each of the half bridge circuits of the three-phase inverter circuit shown in FIG. 8 will be described below in reference to FIGS. 9, 10 and 11 taking the half bridge circuit HB1 as an example.

When the switching element 1a is in ON state and the switching element 1b is in OFF state, a current Ic flows from the terminal of high potential side of the DC voltage generating circuit V1 into the terminal of low potential side thereof through the switching element 1a and a three-phase load LD (shown as an inductor in FIG. 9) as shown in FIG. 9.

Next, when the switching element 1a is switched to be in OFF state and the switching element 1b is switched to be in ON state, the flow of the current Ic stops. However, as the current flowing so far is induced to continue flowing by the three-phase load LD, a free wheeling current Ir temporarily flows into the three-phase LD through the free wheeling diode 2b.

FIG. 10 shows time variation of a potential Vs at the node U considering the ground potential GND as zero. When the switching element 1a is in ON state and the switching element 1b is in OFF state, the potential Vs is approximately the same as the power supply potential Vcc to be provided from the terminal of high potential side of the DC voltage generating circuit V1. However, after time t1 at which the switching element 1a is switched to be in OFF state and the switching element 1b is switched to be in ON state, the flow of the current Ic is suspended until these switching elements are switched again. Due to this, the potential Vs suddenly drops from the power supply potential Vcc.

After transient drop of the potential Vs to a potential Vtr2 having a large degree of a negative value, the potential Vs rises to a potential Vst having a negative value calculated by subtracting a threshold voltage of the free wheeling diode 2b from the ground potential GND and maintains its stationary state until the switching elements are switched again.

When transient increase in a value of the free wheeling current Ir occurs to increase an absolute value of its potential Vtr2 to a certain value or more, the potential Vs at the node U excessively drops. Due to this, increase in a voltage between the control electrode and the electrode for outputting current of the switching element 1a occurs, resulting in the problem of erroneous turn-on of the switching element 1a. As a result of this problem, another problem of malfunction of the HVIC 3 is also caused.

These problems can be avoided by controlling the absolute value of the potential Vtr2 which corresponds to a transient voltage characteristic of the free wheeling diode at a low value. However, in the free wheeling diode of the power arm element in the background art, a thickness of an $n^-$ drift region has been defined to be large to ensure its breakdown voltage having a value approximately the same as that of a breakdown voltage of the switching element. That is, the breakdown voltage of the free wheeling diode, consisting of a cathode electrode CT, n-type semiconductor layers S1a and S1b, a p-type semiconductor layer S2 and an anode electrode AN as shown in FIG. 11, has been ensured by defining a thickness TH of the drift region S1a to be large.

Correlation between the thickness of the $n^-$ drift region and the transient voltage characteristic of the free wheeling diode is positive. Therefore, when the thickness of the $n^-$ drift region is large, the potential Vtr2 during flow of the free wheeling current is likely to have a large degree of a negative value. For this reason, malfunction may occur with high probability in the inverter circuit having the power arm element in the background art.

SUMMARY OF THE INVENTION

A first aspect of the present invention is directed to a power semiconductor device, comprising: a switching element having an electrode for inputting current, an electrode for outputting current and a control electrode; and n diodes ($n \geq 2$) connected in series and each having a cathode an anode, wherein a cathode of a diode arranged at one end of the n diodes is connected to the electrode for inputting current of the switching element and an anode of a diode arranged at another end is connected to the electrode for outputting current of the switching element; and a breakdown voltage between each anode and cathode of the diode is defined to be 1/n of a breakdown voltage between the electrode for inputting current and the electrode for outputting current of the switching element.

According to a second aspect of the present invention, the power semiconductor device according to the first aspect further comprises: n resistors each connected in parallel between respective anodes and cathodes of the n diodes, wherein the n resistors have resistance values approximately equal thereamong.

A third aspect of the present invention is directed to a power arm, comprising: a first power arm element including the power semiconductor device recited in the first or second aspect; and a second power arm element including a switching element having an electrode for inputting current, an electrode for outputting current and a control electrode, and a diode having a cathode connected to the electrode for inputting current and an anode connected to the electrode for outputting current, wherein the first power arm element and the second power arm element are connected in series.

A fourth aspect of the present invention is directed to a power arm, comprising: a first power arm element and a second power arm element each including the power semiconductor device recited in the first or second aspect and connected in series.

A fifth aspect of the present invention is directed to an inverter circuit, comprising: a plurality of power arms, each including a first power arm element including the power semiconductor device recited in the first or second aspect; and a second power arm element including a switching element having an electrode for inputting current, an electrode for outputting current and a control electrode, and a diode having a cathode connected to the electrode for inputting current and an anode connected to the electrode for outputting current, wherein the first power arm element and the second power arm element are connected in series, or including a first power arm element and a second power arm element each including the power semiconductor device recited in the first or second aspect and connected in series; and a control circuit for outputting a control signal that controls each switching element of the power arms, wherein the plurality of power arms are connected in parallel.

A sixth aspect of the present invention is directed to an inverter circuit, comprising: a power arm including a first power arm element including the power semiconductor device recited in the first or second aspect; and a second power arm element including a switching element having an electrode for inputting current, an electrode for outputting current and a control electrode, and a diode having a cathode connected to the electrode for inputting current and an anode connected to the electrode for outputting current, wherein the first power arm element and the second power arm element are connected in series, or including a first power arm element and a second power arm element each including the power semiconductor device recited in the first or second aspect and connected in series; and a control circuit for outputting a control signal that controls each switching element of the power arm.

According to the first aspect of the present invention, as compared with a power semiconductor device in the background art including a single diode having a breakdown voltage approximately the same as that of a switching element and connected in inverse-parallel connection to the switching element, a transient voltage characteristic can be kept low during flow of a free wheeling current into a diode.

According to the second aspect of the present invention, as the resistors having resistance values approximately equal thereamong are respectively connected in parallel to each of the n diodes, voltages generated between an anode and a cathode of each diode are made equal. As a result, transient voltage characteristics of each diode can be uniformed.

According to the third aspect of the present invention, a transient voltage characteristic can be kept low during flow of a free wheeling current into the first power arm element. As a result, there occurs small variation in potential at a point where the first power arm element and the second power arm element are connected in series.

According to the fourth aspect of the present invention, a transient voltage characteristic can be kept low during flow of a free wheeling current into the first and the second power arm elements. As a result, there occurs variation in potential, that is smaller than the variation occurred in the power arm according to the third aspect, at the point where the first power arm element and the second power arm element are connected in series.

According to the fifth aspect of the present invention, there occurs small variation in potential at the point where the first power arm element and the second power arm element are connected in series. As a result, an inverter circuit ensuring a high breakdown voltage and having low probability of malfunction can be obtained.

According to the sixth aspect of the present invention, there occurs small variation in potential at the point where the first power arm element and the second power arm element are connected in series. As a result, an inverter circuit ensuring a high breakdown voltage and having low probability of malfunction can be obtained.

It is therefore an object of the present invention to provide an inverter circuit including a power arm ensuring a high breakdown voltage and having low probability of malfunction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing time variation of a potential Vs at a node U considering a ground potential GND as zero in the inverter circuit according to the first preferred embodiment of the present invention;

DESCRIPTION OF THE PREFERRED EMBODIMENTS

<First Preferred Embodiment>

In a power arm element according to the first preferred embodiment of the present invention, n diodes (n≧2) connected in inverse-parallel connection to a switching element are connected in series. A breakdown voltage between an anode and a cathode of each diode is defined to be 1/n of a breakdown voltage of the switching element, to realize an inverter circuit ensuring a high breakdown voltage and having low probability of malfunction.

Figure 1:
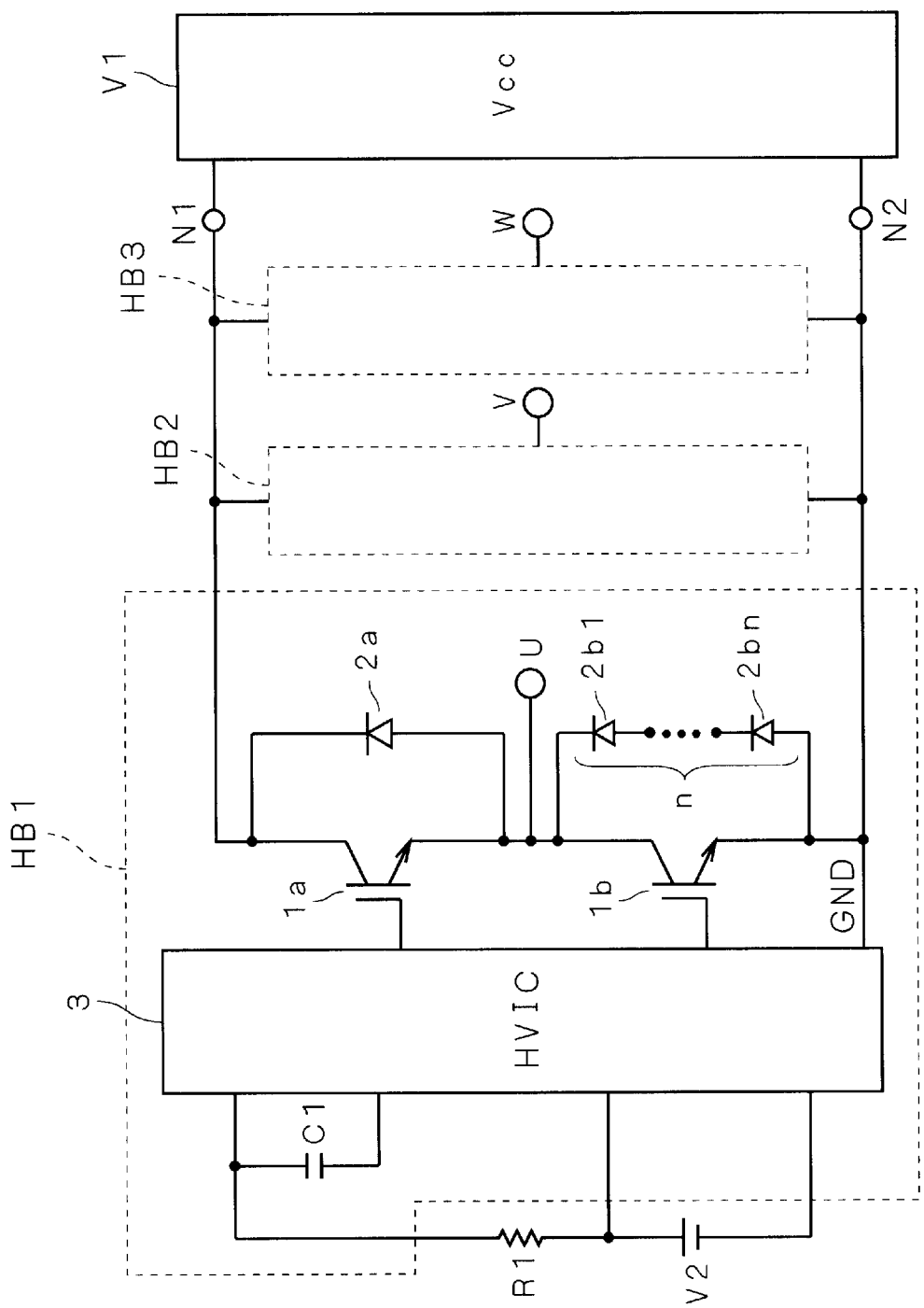
FIG. 1 is a diagram showing an inverter circuit according to a first preferred embodiment of the present invention.

A three-phase inverter circuit is shown in FIG. 1 as an example of the inverter circuit according to the first preferred embodiment. In FIG. 1, the reference number V1 represents a DC voltage generating circuit such as a DC voltage source consisting of a commercial AC power supply and a diode bridge or a battery. The reference numbers HB1, HB2 and HB3 represent single-phase half bridge circuits for generating an AC voltage from a DC voltage Vcc generated at the DC voltage generating circuit V1.

A power arm of the half bridge circuit HB1 consists of a power arm element including a switching element 1a and a free wheeling diode 2a connected in inverse-parallel connection and another power arm element including a switching element 1b and n free wheeling diodes 2b1 to 2bn connected in series. These power arm elements are connected in series at a node U. An IGBT, a power bipolar transistor, a power MOSFET and the like are applicable as the switching elements 1a and 1b.

More particularly, an electrode for inputting current of the switching element 1a (corresponding to a collector when the switching element 1a is an N-channel type IGBT) is connected to a cathode of the free wheeling diode 2a and an electrode for outputting current of the switching element 1a (corresponding to an emitter when the switching element 1a is an N-channel type IGBT) is connected to an anode of the free wheeling diode 2a.

A cathode of the free wheeling diode 2b1 arranged at one end of the free wheeling diodes 2b1 to 2bn is connected to an electrode for inputting current of the switching element 1b and an anode of the free wheeling diode 2bn arranged at another end is connected to an electrode for outputting current of the switching element 1b. The electrode for outputting current of the switching element 1a is connected to the electrode for inputting current of the switching element 1b at the node U.

The electrode for inputting current of the switching element 1a is connected to a terminal of high potential side of the DC voltage generating circuit V1 at a node N1. The electrode for outputting current of the switching element 1b is connected to a terminal of low potential side of the DC voltage generating circuit V1 at a node N2.

Similar to the half bridge circuit HB1, the half bridge circuits HB2 and HB3 respectively include two power arm elements connected in series at nodes V and W. Switching elements of each power arm element are connected to the terminal of high potential side and the terminal of low potential side of the DC voltage generating circuit V1 at the nodes N1 and N2. For brevity, the power arm elements of the half bridge circuits HB1, HB2 and HB3 are omitted as well in FIG. 1.

Three-phase loads (not shown) including three connecting terminals having shapes such as Y shape or Δ shape are connected to the nodes U, V and W.

A control signal such as a PWM signal is applied from an HVIC 3 acting as a control circuit to control electrodes (corresponding to a gate when the switching elements 1a and 1b are IGBTs) of the switching elements 1a and 1b of the half bridge circuit HB1. On receipt of the control signal in predetermined timing, each of the switching elements 1a and 1b is turned on and off to generate an AC voltage having arbitrary frequency to be applied to the terminal of the three-phase load connected to the node U. Similar to the half bridge circuit HB1, control electrodes of the half bridge circuits HB2 and HB3 receive a control signal from the HVIC 3 to apply an AC voltage having arbitrary frequency to the terminals of the three-phase loads connected to the nodes V and W.

Peripheral circuits such as a voltage source V2 for operating the HVIC 3, a resistor R1 and a capacitor C1 are connected to the HVIC 3. The HVIC 3 and its peripheral circuits may be individually provided to each of the half bridge circuits HB1, HB2 and HB3. Alternatively, each of the half bridge circuits HB1, HB2 and HB3 can be controlled by a single set of the HVIC 3 and its peripheral circuits. FIG. 1 shows an example in which the HVIC 3 and the capacitor C1 are individually provided to each of the half bridge circuits HB1, HB2 and HB3 and the voltage source V2 and the resistor R1 are shared among the half bridge circuits HB1, HB2 and HB3.

A ground potential terminal of the HVIC 3 is connected to the node N2 for receiving a ground potential GND from the terminal of low potential side of the DC voltage generating circuit V1.

In the inverter circuit according to the first preferred embodiment, one power arm element includes n free wheeling diodes connected in series and a breakdown voltage of each free wheeling diode is defined to be 1/n of a breakdown voltage of the switching element 1b.

Figure 11:
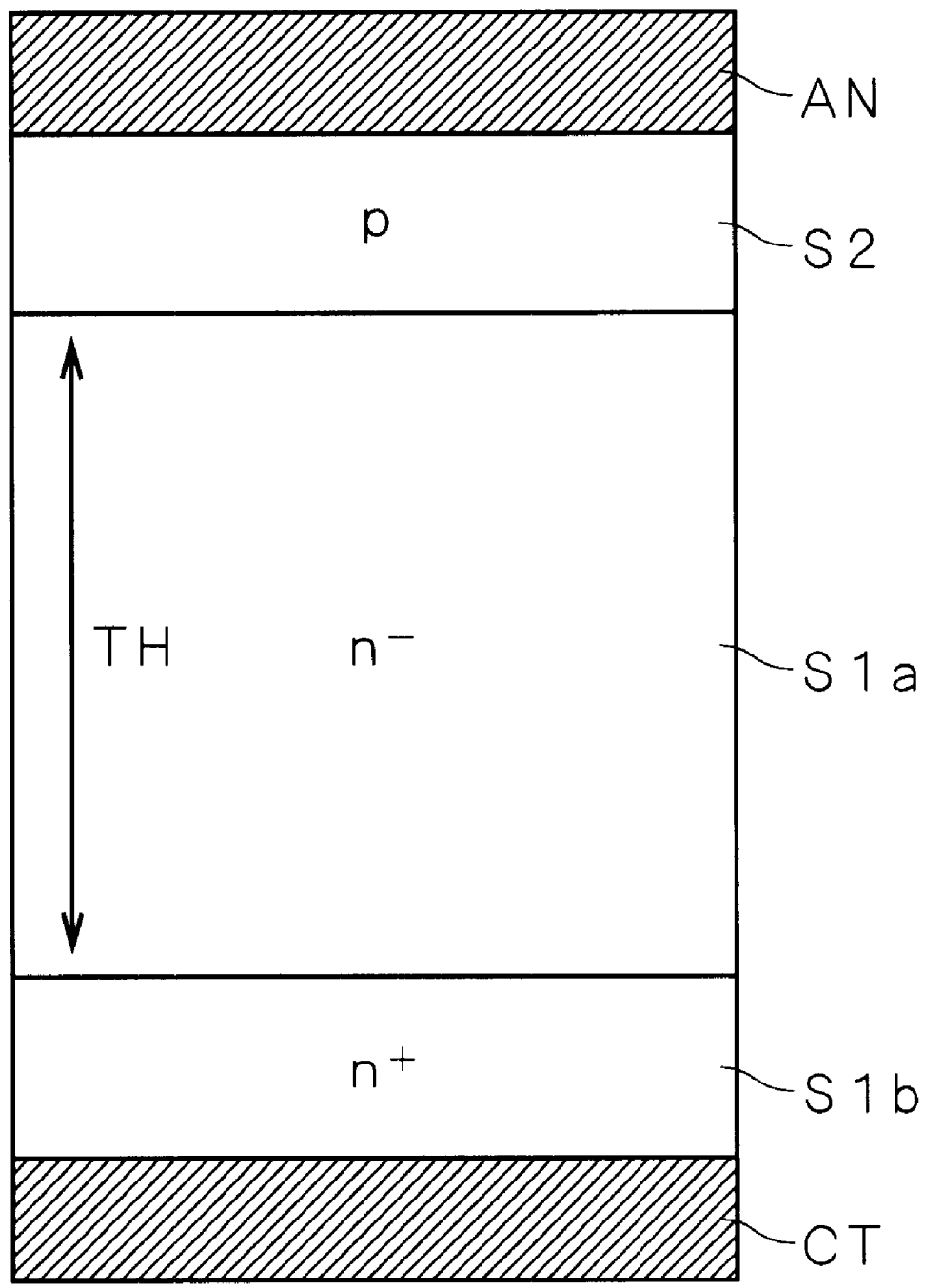
FIG. 11 is a cross section showing a structure of a free wheeling diode in a power arm element in the background art.

The breakdown voltage of each free wheeling diode is lowered from the following reason. That is, in order to ensure breakdown voltage of the free wheeling diode of the power arm element in the background art, it has been inevitable to define the thickness TH of the $n^-$ drift region S1a to be large as shown in FIG. 11, simultaneously accompanied with increase in the transient voltage characteristic during flow of the free wheeling current. Due to this, there has been high probability of malfunction of the inverter circuit.

In the present invention, the breakdown voltage of each free wheeling diode is lowered to be 1/n of the switching element and the thickness TH of the $n^-$ drift region S1a is reduced, to thereby keep the transient voltage characteristic low during flow of the free wheeling current. The drop in the breakdown voltage is compensated with the n free wheeling diodes connected in series, to ensure breakdown voltage of a degree approximately the same as that of the switching element.

Figure 10:
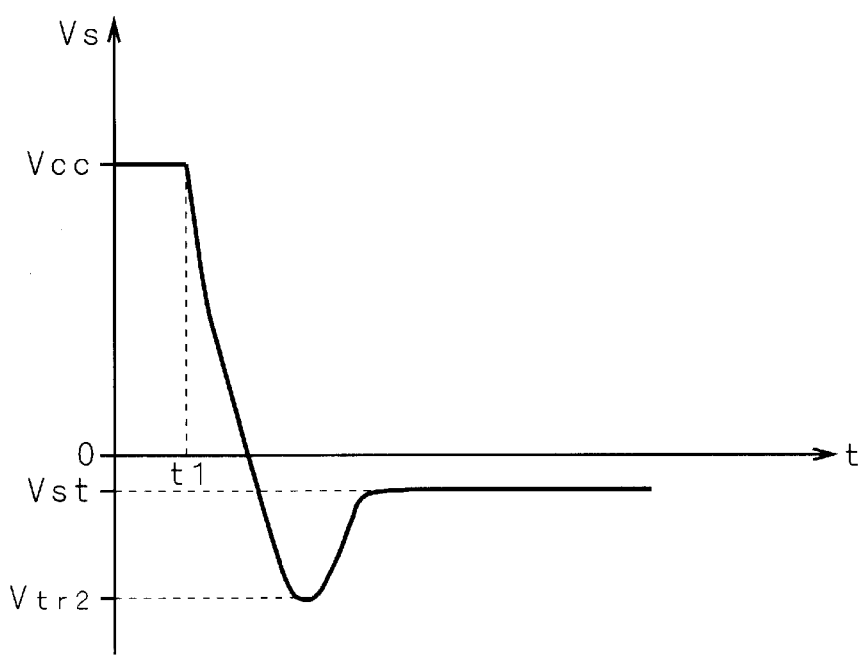
FIG. 10 is a diagram showing time variation of a potential Vs at a node U considering a ground potential GND as zero in the inverter circuit in the background art.

The n free wheeling diodes are connected in series through wiring on a substrate or aluminum wire, for example. Delay in change in the voltage is caused to some extent by a resistive component and capacitive component, for example, in the wiring or the like. For this reason, an overshoot of the transient voltage characteristic is reduced as shown in FIG. 2. Similar to FIG. 10, FIG. 2 is a diagram showing time variation of a potential Vs at the node U considering the ground potential GND as zero in the inverter circuit according to the first preferred embodiment. As shown in FIG. 2, the potential Vs drops to a potential Vtr1 having a smaller degree of a negative value than that of a potential Vtr2 in the background art.

Therefore, as compared with the power arm element in the background art including a single diode having a breakdown voltage approximately the same as that of the switching element and connected in inverse-parallel connection to the switching element, the power arm element having the aforementioned structure allows the transient voltage characteristic to be kept low during flow of the free wheeling current into the diode.

Further, the inverter circuit having the power arm consisting of the aforementioned power arm elements allows the transient voltage characteristic to be kept low during flow of the free wheeling current into the free wheeling diode. Therefore, there occurs small variation in potential at the point where the power arm elements are connected in series (the node U in FIG. 1, for example). As a result, the inverter circuit ensuring a high breakdown voltage and having low probability of malfunction can be obtained.

<Second Preferred Embodiment>

The second preferred embodiment of the present invention is a modification of the inverter circuit according to the first preferred embodiment. Resistors having resistance values approximately equal thereamong are respectively connected in parallel to each free wheeling diode of a power arm element. As a result, an inverter circuit allowing voltages generated between an anode and a cathode of each free wheeling diode to be made equal can be realized.

Figure 3:
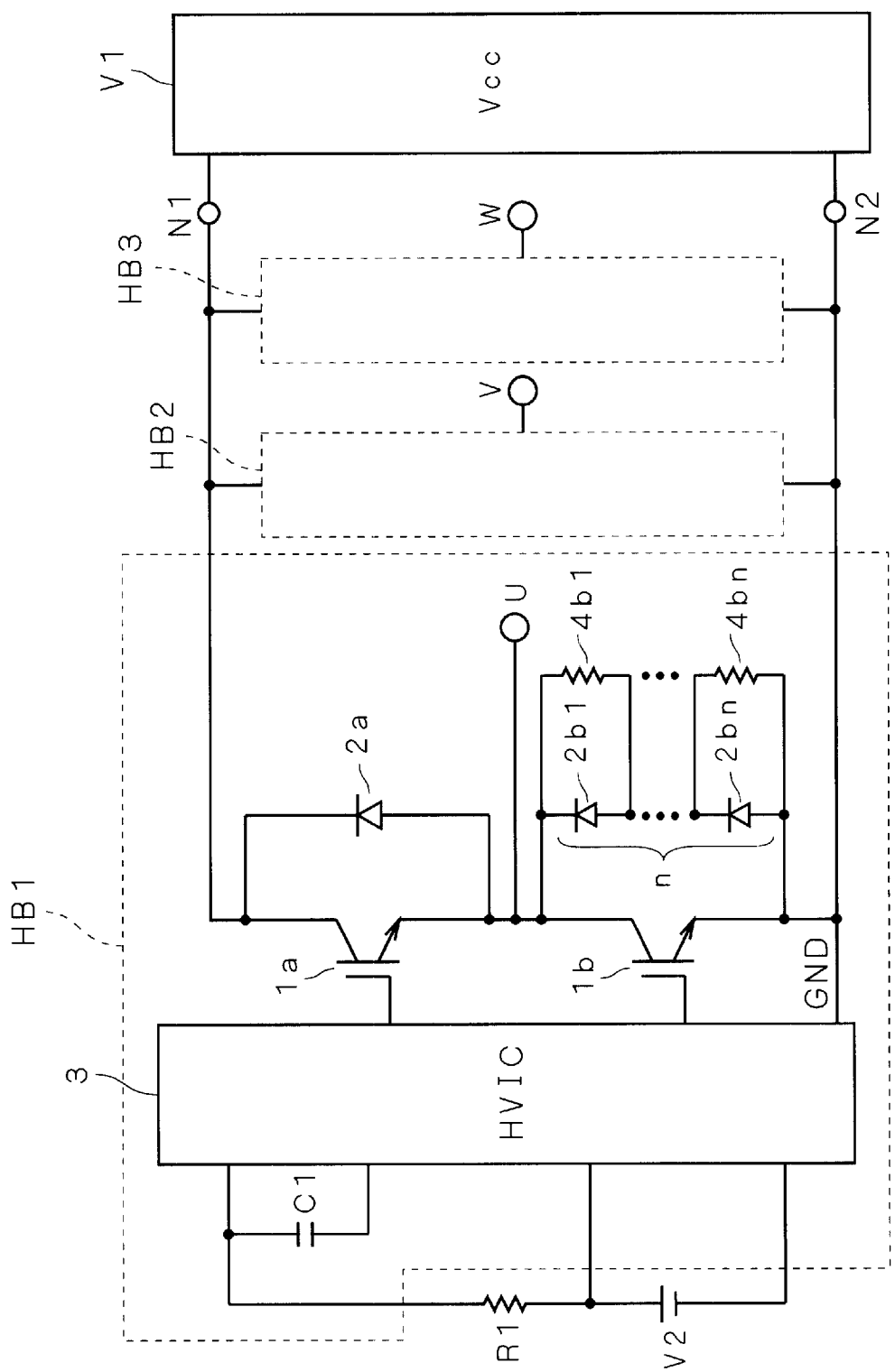
FIG. 3 is a diagram showing an inverter circuit according to a second preferred embodiment of the present invention.

FIG. 3 shows an inverter circuit according to the second preferred embodiment. As shown in FIG. 3, a power arm element according to the second preferred embodiment includes n resistors 4b1 to 4bn each connected in parallel between the anode and the cathode of the respective free wheeling diodes 2b1 to 2bn. These resistors 4b1 to 4bn have resistance values approximately equal thereamong.

As the resistors having resistance values approximately equal thereamong are connected in parallel to each of the n free wheeling diodes, voltages generated between the anode and the cathode of each free wheeling diode are made equal in the power arm element. As a result, transient voltage characteristics of each of the free wheeling diodes can be uniformed.

As the other formation of the inverter circuit according to the second preferred embodiment is the same as that of the inverter circuit according to the first preferred embodiment, the description thereof is omitted here.

<Third Preferred Embodiment>

The third preferred embodiment of the present invention is a modification of the inverter circuit according to the first preferred embodiment. While only one power arm element of the power arm includes a plurality of free wheeling diodes according to the first preferred embodiment, both power arm elements of a power arm include a plurality of free wheeling diodes according to the third preferred embodiment. As both power arm elements include a plurality of free wheeling diodes, an inverter circuit ensuring a high breakdown voltage and having lower probability of malfunction can be realized.

Figure 4:
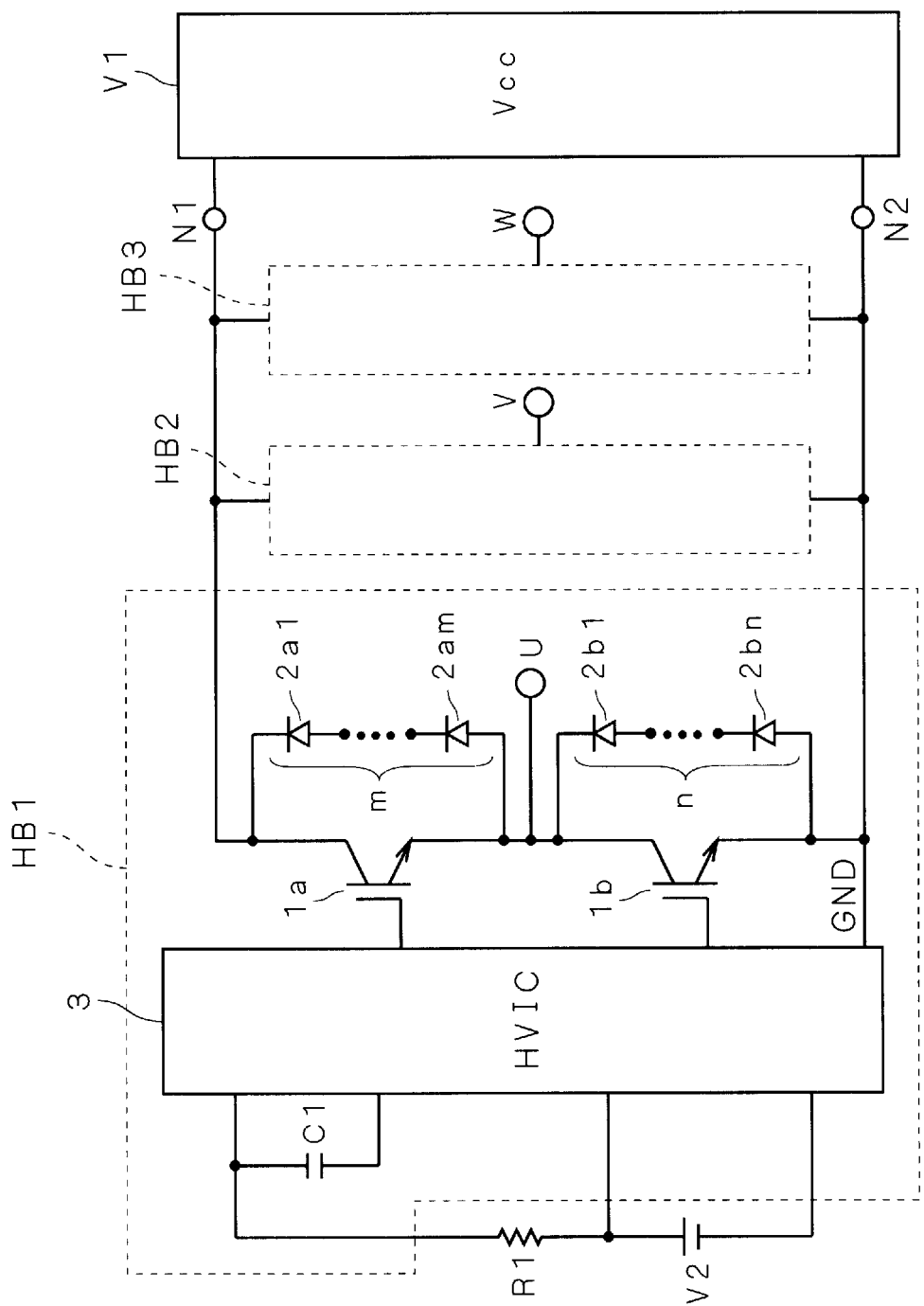
FIG. 4 is a diagram showing an inverter circuit according to a third preferred embodiment of the present invention.

FIG. 4 shows an inverter circuit according to the third preferred embodiment. As shown in FIG. 4, a power arm element having the switching element 1a as well as a power arm element having the switching element 1b includes m free wheeling diodes ($m \geq 2$).

The half bridge circuit HB1 consists of a power arm element including the switching element 1a and m free wheeling diodes 2a1 to 2am connected in series and another power arm element including the switching element 1b and the n free wheeling diodes 2b1 to 2bn connected in series. These power arm elements are connected in series at the node U. An IGBT, a power bipolar transistor, a power MOSFET and the like are applicable as the switching elements 1a and 1b.

More particularly, a cathode of the free wheeling diode 2a1 arranged at one end of the free wheeling diodes 2a1 to 2am is connected to the electrode for inputting current of the switching element 1a and an anode of the free wheeling diode 2am arranged at another end is connected to the electrode for outputting current of the switching element 1a. The electrode for outputting current of the switching element 1a is connected to the electrode for inputting current of the switching element 1b at the node U.

The cathode of the free wheeling diode 2b1 arranged at one end of the free wheeling diodes 2b1 to 2bn is connected to the electrode for inputting current of the switching element 1b and the anode of the free wheeling diode 2bn arranged at another end is connected to the electrode for outputting current of the switching element 1b. The electrode for outputting current of the switching element 1a is connected to the electrode for inputting current of the switching element 1b at the node U.

As both of the power arm elements of the power arm of the half bridge circuit HB1 includes a plurality of free wheeling diodes as described above, transient voltage characteristics can be kept low during flow of free wheeling currents into the free wheeling diodes. Therefore, variation in potential to occur at the point where two power arm elements are connected in series becomes smaller than that of the inverter circuit according to the first preferred embodiment. As a result, the inverter circuit ensuring a high breakdown voltage and having low probability of malfunction can be obtained.

As the other formation of the inverter circuit according to the third preferred embodiment is the same as that of the inverter circuit according to the first preferred embodiment, the description thereof is omitted here.

<Fourth Preferred Embodiment>

The fourth preferred embodiment of the present invention is a modification of the inverter circuit according to the third preferred embodiment. Resistors having resistance values approximately equal thereamong are respectively connected in parallel to each free wheeling diode of a power arm element. As a result, an inverter circuit allowing voltages generated between an anode and a cathode of each free wheeling diode to be made equal can be realized.

Figure 5:
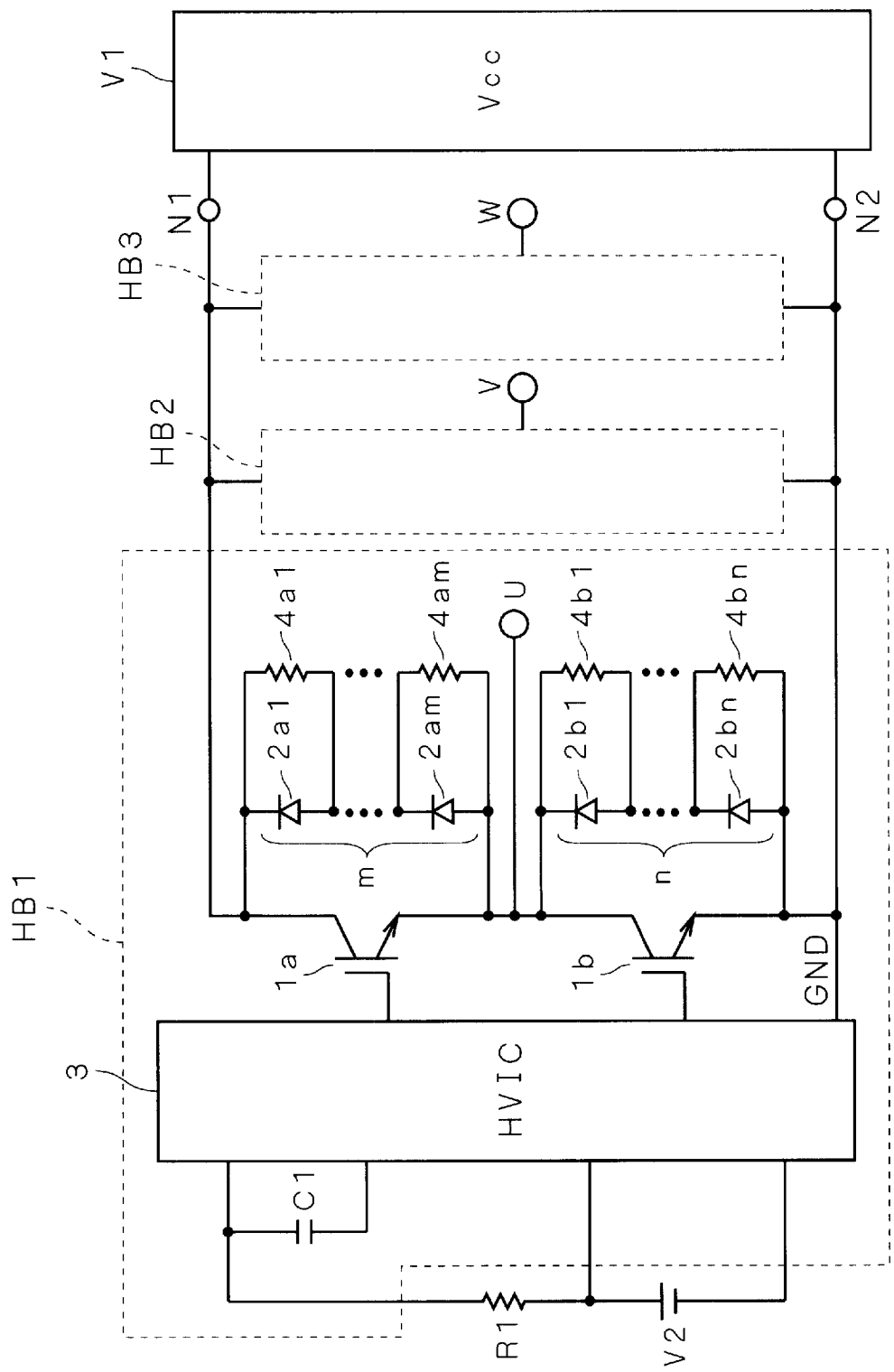
FIG. 5 is a diagram showing an inverter circuit according to a fourth preferred embodiment of the present invention.

FIG. 5 shows an inverter circuit according to the fourth preferred embodiment. As shown in FIG. 5, power arm elements according to the fourth preferred embodiment include m resistors 4a1 to 4am each connected in parallel between the anode and the cathode of the respective free wheeling diodes 2a1 to 2am and the n resistors 4b1 to 4bn each connected in parallel between the anode and the cathode of the respective free wheeling diodes 2b1 to 2bn. These resistors 4a1 to 4am and 4b1 to 4bn have resistance values approximately equal thereamong, respectively.

As the m resistors and the n resistors respectively having resistance values approximately equal thereamong are connected in parallel to each of the m free wheeling diodes and n free wheeling diodes, voltages generated between the anode and the cathode of each free wheeling diode are made equal in the power arm elements. As a result, transient voltage characteristics of each of the free wheeling diodes can be uniformed.

As the other formation of the inverter circuit according to the fourth preferred embodiment is the same as that of the inverter circuit according to the third preferred embodiment, the description thereof is omitted here.

<Fifth Preferred Embodiment>

The fifth preferred embodiment of the present invention is a modification of the inverter circuit according to the first preferred embodiment. While the three-phase inverter circuit is described as an example of the inverter circuit according to the first preferred embodiment, the power arm element described in the first preferred embodiment is applied to a single-phase half bridge circuit in the fifth preferred embodiment.

Figure 6:
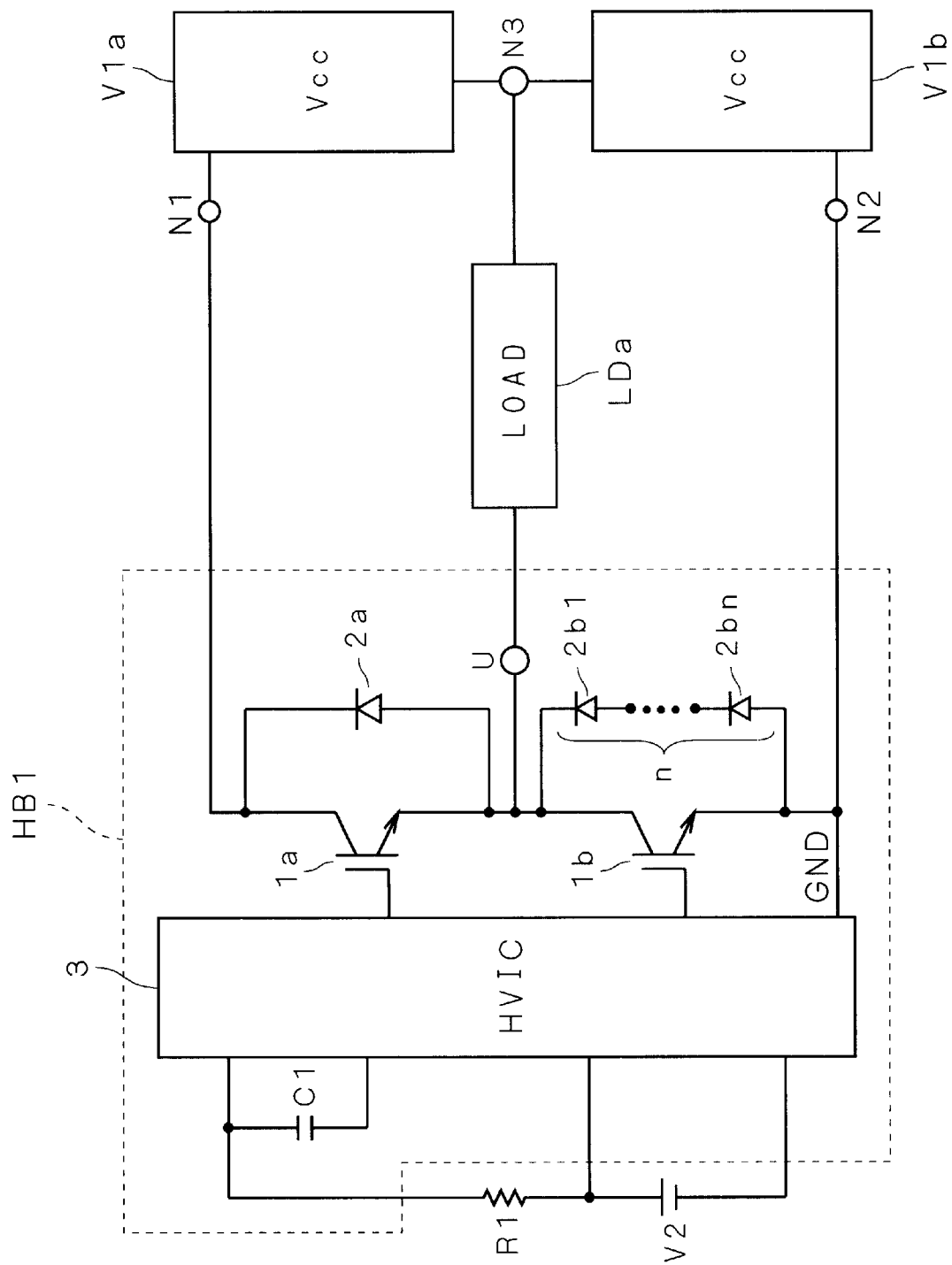
FIG. 6 is a diagram showing an inverter circuit according to a fifth preferred embodiment of the present invention.

FIG. 6 shows an inverter circuit according to the fifth preferred embodiment. Similar to the inverter circuit according to the first preferred embodiment, the inverter circuit according to the fifth preferred embodiment includes the resistor R1, the voltage source V2 and the half bridge circuit HB1.

As a substitute for the DC voltage generating circuit V1, DC voltage generating circuits V1a and V1b for generating the DC voltage Vcc is provided to the inverter circuit according to the fifth preferred embodiment. A terminal of low potential side of the DC voltage generating circuit V1a and a terminal of high potential side of the DC voltage generating circuit V1b are connected at a node N3. A terminal of high potential side of the DC voltage generating circuit V1a and the electrode for inputting current of the switching element 1a are connected at the node N1. A terminal of low potential side of the DC voltage generating circuit V1b and the electrode for outputting current of the switching element 1b are connected at the node N2.

A load LDa is inserted between the node U of the half bridge circuit HB1 and the node N3.

The power arm element including the n free wheeling diodes connected in series and each having a breakdown voltage reduced to 1/n is applied to the single-phase half bridge circuit. As a result, an inverter circuit ensuring a high breakdown voltage and having low probability of malfunction is also obtained.

It is a matter of course that each half bridge circuit described in the second, third and fourth preferred embodiments can be substituted for the half bridge circuit HB1 in the fifth preferred embodiment.

<Sixth Preferred Embodiment>

The sixth preferred embodiment of the present invention is a modification of the inverter circuit according to the first preferred embodiment. While the three-phase inverter circuit is described as an example of the inverter circuit according to the first preferred embodiment, the power arm described in the first preferred embodiment is applied to a single-phase full bridge circuit in the sixth preferred embodiment.

Figure 7:
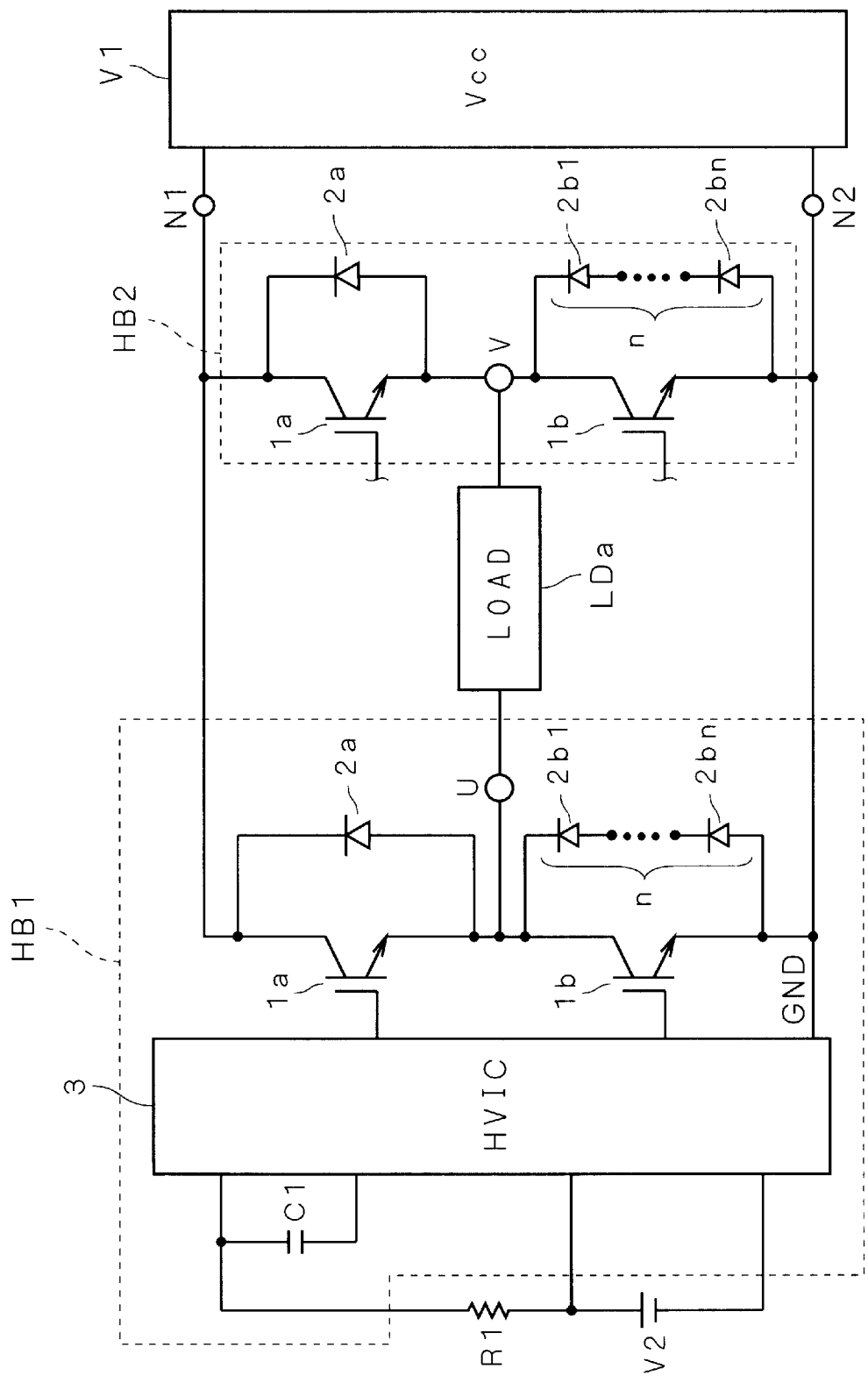
FIG. 7 is a diagram showing an inverter circuit according to a sixth preferred embodiment of the present invention.
Figure 8:
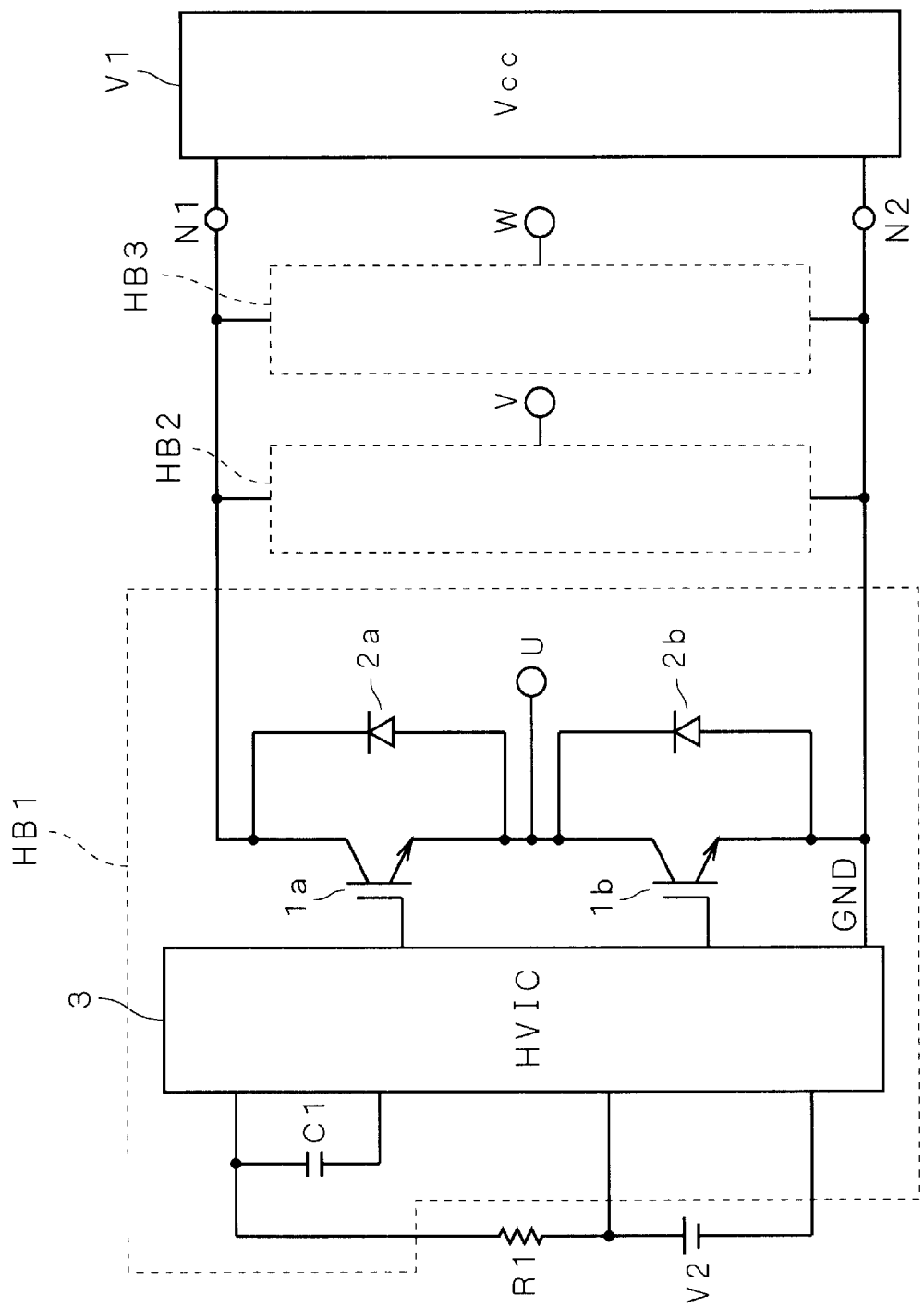
FIG. 8 is a diagram showing an inverter circuit in the background art.
Figure 9:
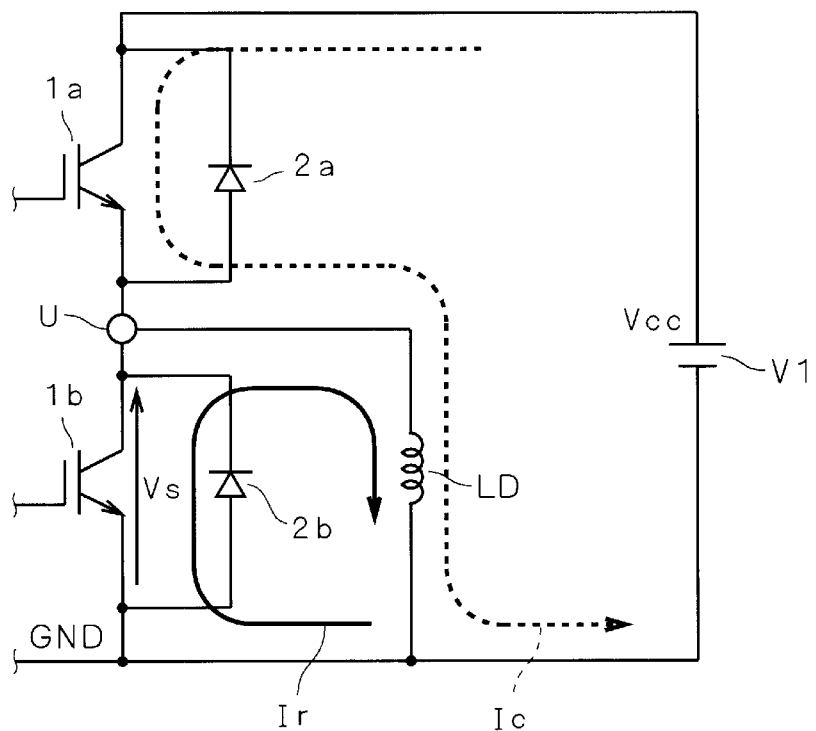
FIG. 9 is a diagram showing flow of a current into a three-phase load in the inverter circuit in the background art.

FIG. 7 shows an inverter circuit according to the sixth preferred embodiment. Similar to the inverter circuit according to the first preferred embodiment, the inverter circuit according to the sixth preferred embodiment includes the resistor R1, the voltage source V2, the DC voltage generating circuit V1 and the half bridge circuits HB1 and HB2.

The terminal of high potential side of the DC voltage generating circuit V1 and the electrodes for inputting current of the switching elements 1a of the half bridge circuits HB1, HB2 are connected at the node N1. The terminal of low potential side of the DC voltage generating circuit V1 and the electrodes for outputting current of the switching elements 1b of the half bridge circuits HB1, HB2 are connected at the node N2.

The load LDa is inserted between the node U of the half bridge circuit HB1 and the node V of the half bridge circuit HB2.

The HVIC 3 and the capacitor C1 in the half bridge circuit HB2 are not shown in FIG. 7.

The power arm element including the n free wheeling diodes connected in series and each having a breakdown voltage reduced to 1/n is applied to the single-phase full bridge circuit. As a result, an inverter circuit ensuring a high breakdown voltage and having low probability of malfunction is also obtained.

It is a matter of course that each half bridge circuit described in the second, third and fourth preferred embodiments can be substituted for the half bridge circuits HB1 and HB2 in the sixth preferred embodiment.

While the invention has been shown and described in detail, the foregoing description is in all aspects illustrative and not restrictive. It is therefore understood that numerous modifications and variations can be devised without departing from the scope of the invention.

What is claimed is:

1. A power semiconductor device, comprising:
   a switching element having an electrode for inputting current, an electrode for outputting current and a control electrode; and n diodes (n≧2) connected in series and each having a cathode and an anode, wherein a cathode of a diode arranged at one end of said n diodes is connected to said electrode for inputting current of said switching element and an anode of a diode arranged at another end is connected to said electrode for outputting current of said switching element; and a breakdown voltage between each anode and cathode of said diode is defined to be 1/n of a breakdown voltage between said electrode for inputting current and said electrode for outputting current of said switching element.

2. The power semiconductor device according to claim 1, further comprising:

n resistors each connected in parallel between respective anodes and cathodes of said n diodes, wherein said n resistors have resistance values approximately equal thereamong.

3. A power arm, comprising:

a first power arm element including the power semiconductor device recited in claim 1; and a second power arm element including a switching element having an electrode for inputting current, an electrode for outputting current and a control electrode, and a diode having a cathode connected to said electrode for inputting current and an anode connected to said electrode for outputting current, wherein said first power arm element and said second power arm element are connected in series.

4. A power arm, comprising:

a first power arm element and a second power arm element each including the power semiconductor device recited in claim 1 and connected in series.

5. An inverter circuit, comprising:

a plurality of power arms, each including a first power arm element including the power semiconductor device recited in claim 1; and a second power arm element including a switching element having an electrode for inputting current, an electrode for outputting current and a control electrode, and a diode having a cathode connected to said electrode for inputting current and an anode connected to said electrode for outputting current, wherein said first power arm element and said second power arm element are connected in series; and a control circuit for outputting a control signal that controls each switching element of said power arms, wherein said plurality of power arms are connected in parallel.

6. The inverter circuit according to claim 5, further comprising:

a DC voltage generating circuit for generating a predetermined DC voltage; and a load having a connecting terminal, wherein said predetermined DC voltage is applied to both ends of said plurality of power arms connected in parallel; and said connecting terminal of said load is connected to a point where said first power arm element and said second power arm element are connected in series.

7. The inverter circuit according to claim 6, wherein said load is a three-phase load including first, second and third connecting terminals;

said plurality of power arms include three pairs; and said first, second and third connecting terminals of said load are respectively connected to points where power arm elements of said three pairs of said power arms are connected in series.

8. The inverter circuit according to claim 6, wherein said load is a single-phase load including a first connecting terminal and a second connecting terminal;

said plurality of power arms include two pairs; and said first connecting terminal and said second connecting terminal of said single-phase load are respectively connected to points where power arm elements of said two pairs of said power arms are connected in series.

9. An inverter circuit, comprising:

a plurality of power arms, each including a first power arm element and a second power arm element each including the power semiconductor device recited in claim 1 and connected in series; and a control circuit for outputting a control signal that controls each switching element of said power arms, wherein said plurality of power arms are connected in parallel.

10. The inverter circuit according to claim 9, further comprising:

a DC voltage generating circuit for generating a predetermined DC voltage; and a load having a connecting terminal, wherein said predetermined DC voltage is applied to both ends of said plurality of power arms connected in parallel; and said connecting terminal of said load is connected to a point where said first power element and said second power arm element are connected in series.

11. The inverter circuit according to claim 10, wherein said load is a three-phase load including first, second and third connecting terminals;

said plurality of power arms include three pairs; and said first, second and third connecting terminals of said load are respectively connected to points where power arm elements of said three pairs of said power arms are connected in series.

12. The inverter circuit according to claim 10, wherein said load is a single-phase load including a first connecting terminal and a second connecting terminal;

said plurality of power arms include two pairs; and said first connecting terminal and said second connecting terminal of said single-phase load are respectively connected to points where power arm elements of said two pairs of said power arms are connected in series.

13. An inverter circuit, comprising:

a power arm including a first power arm element including the power semiconductor device recited in claim 1; and a second power arm element including a switching element having an electrode for inputting current, an electrode for outputting current and a control electrode and a diode having a cathode connected to said electrode for inputting current and an anode connected to said electrode for outputting current, wherein said first power arm element and said second power arm element are connected in series; and a control circuit for outputting a control signal that controls each switching element of said power arm.

14. The inverter circuit according to claim 13, further comprising:

a first DC voltage generating circuit and a second DC voltage generating circuit for generating a predetermined DC voltage; and a load having two connecting terminals, wherein said first DC voltage generating circuit and said second DC voltage generating circuit are connected in series;

one of said connecting terminals of said load is connected to a point where said first DC voltage generating circuit and said second DC voltage generating circuit are connected in series;

another one of said connecting terminals of said load is connected to a point where said first power arm element and said second power arm element are connected in series;

said predetermined DC voltage generated by said first DC voltage generating circuit is applied to series connection of said first power arm element and said load; and said predetermined DC voltage generated by said second DC voltage generating circuit is applied to series connection of said second power arm element and said load.

15. An inverter circuit, comprising:

a power arm including a first power arm element and a second power arm element each including the power semiconductor device recited in claim 1 and connected in series; and a control circuit for outputting a control signal that controls each switching element of said power arm.

16. The inverter circuit according to claim 15, further comprising:

a first DC voltage generating circuit and a second DC voltage generating circuit for generating a predetermined DC voltage; and a load having two connecting terminals, wherein said first DC voltage generating circuit and said second DC voltage generating circuit are connected in series;

one of said connecting terminals of said load is connected to a point where said first DC voltage generating circuit and said second DC voltage generating circuit are connected in series;

another one of said connecting terminals of said load is connected to a point where said first power arm element and said second power arm element are connected in series;

said predetermined DC voltage generated by said first DC voltage generating circuit is applied to series connection of said first power arm element and said load; and said predetermined DC voltage generated by said second DC voltage generating circuit is applied to series connection of said second power arm element and said load.

* * * * *